United States Patent [19]

Kaewell, Jr. et al.

[11] Patent Number: 4,953,197
[45] Date of Patent: Aug. 28, 1990

[54] COMBINATION SPATIAL DIVERSITY SYSTEM

[75] Inventors: John D. Kaewell, Jr., Bensalem, Pa.; Nicholas C. Schreier, Mercerville, N.J.; James J. Roller, Media, Pa.

[73] Assignee: International Mobile Machines Corporation, Phila., Pa.

[21] Appl. No.: 281,186

[22] Filed: Dec. 8, 1988

[51] Int. Cl.[5] ............................................... H04B 7/08
[52] U.S. Cl. ........................................ 379/58; 379/63; 455/135
[58] Field of Search ..................... 379/58; 455/33, 52, 455/54, 101, 134, 135, 136, 277

[56] References Cited

U.S. PATENT DOCUMENTS

| | | | |
|---|---|---|---|
| 3,328,698 | 6/1967 | Schreder | 455/135 |
| 4,028,627 | 6/1977 | Cho et al. | 455/136 |
| 4,035,728 | 7/1977 | Ishikawa et al. | 455/134 |
| 4,057,758 | 11/1977 | Hattori et al. | 455/52 |
| 4,204,164 | 5/1980 | Kage | 455/135 |
| 4,214,213 | 7/1980 | Ferrie | 455/135 |
| 4,383,332 | 5/1983 | Glance et al. | 455/52 |
| 4,477,809 | 10/1984 | Bose | 455/54 |
| 4,675,863 | 6/1987 | Paneth et al. | 455/33 |
| 4,704,734 | 11/1987 | Menich et al. | 455/134 |
| 4,756,023 | 7/1988 | Kojima | 455/136 |

*Primary Examiner*—Robert Lev
*Attorney, Agent, or Firm*—Arthur A. Jacobs

[57] ABSTRACT

A spatial diversity system for digital mobile telephone networks which comprises at least two antennas, one antenna being part of a primary (or master) unit and the other being part of a diversity (or slave) unit, each unit having processing means to detect the "quality" of digital audio signals received by their respective antennas, the "quality" comprising link quality, AGC level and parity errors; the primary unit being capable of comparing the "quality" of the audio signals received by each antenna, selecting the higher "quality" signal and transmitting the higher "quality" signal to the telephone network.

8 Claims, 6 Drawing Sheets

BASE STATION POST-SYNTHESIS BLOCK DIVERSITY SYSTEM

COMBINATION SPATIAL DIVERSITY SYSTEM

BACKGROUND OF THE INVENTION

Cellular (or mobile) telephone systems are assuming increasing importance in the art of telephony and may eventually displace a significant portion of fixed wireline service as it becomes technically more efficient.

Cellular telephony is based on radio frequency (RF) rather than wireline technology and therefore is subject to many problems which do not arise in wireline service.

Although mobile cellular systems have heretofore been based primarily on analog technology, this technology has severe limitations involving, inter alia, complexity, spectrum efficiency, privacy and cost. This has led to developments whereby digital technology, which is already in place for fixed telephone service, is now beginning to be substituted for the analog technology.

It is apparent that mobile systems will eventually include both the portable, or hand-carried, telephone type and the vehicle-mounted type. The present invention, although foreseeably adaptable to the portable type, is primarily concerned with the vehicle-mounted type of system.

One of the problems in RF based communication systems, especially when used in a mobile environment, is their susceptibility to fading and shadowing. This is a common phenomena which is often encountered in a vehicular-mounted radio where reception suddenly fades at one spot but is restored by a small movement of the vehicle.

A well-known technique to combat such fading and shadowing is the use of diversity. Two types of diversity heretofore used were time diversity which comprises the sending and receiving of the same message more than once and frequency diversity which comprises the sending and receiving of a message on more than one carrier frequency. However, both of these methods are subject to the drawback that they require additional bandwidth.

A third type of diversity, which does not require additional bandwidth, is spatial diversity. This comprises the use of two or more antennas that are separated from each other by an appropriate distance on the vehicle. Since the fading characteristics of these antennas are statistically independent of each other, when one is subject to fading the other can generally carry the full signal and thereby obviate the fading effects. However, these separate antennas provide separate signals which could result in duplication and interference with each other when not properly controlled.

SUMMARY OF THE INVENTION

The present invention comprises a spatial diversity system wherein the individual signals of the separate antennas are effectively combined into a single high quality, non-fading, non-shadowing signal, thereby avoiding duplication and interference of the individual signals while maintaining the advantage of spatial diversity which does not require the utilization of additional bandwith which is required by other diversity systems such as time diversity or frequency diversity.

In essence, in the system of this invention, one antenna circuit comprises a primary (or master) unit while the other comprises a diversity (or slave) unit. Each unit receives its individual signal and processes it to detect parity errors, AGC level and link quality (The term "parity error" means a bit error causing distortion or fading, a high AGC level indicates deterioration of the signals due to either fading or interference, and link quality is a measure of phase error—the higher the link quality number, the lower the amount of phase error.).

The processed parity errors, link quality and AGC level of the two antenna units are then compared and the better signal, containing the fewest parity errors, lowest AGC level and best link quality, is applied to the receiver.

Although this spatial diversity system is herein described as applied to the receive side of a subscriber unit or base station it is also applicable to the transmit side of either the subscriber unit or base station.

GLOSSARY OF ACRONYMS

| Acronym | Definition |
|---|---|
| AGC | Automatic Gain Control |
| CCU | Channel Control Unit |
| CODEC | Combined Coder and Decoder |
| DMA | Direct Memory Access |
| FIFO | First-in First-out Memory |
| IF | Intermediate Frequencies |
| LQ | Link Quality |
| MODEM | Combined Modulator and Demodulator |
| MUX | Multiplexer |
| PCM | Pulse Code Modulation |
| PE | Parity Error |
| RELP | Residual Exited Linear Prediction |
| RF | Radio Frequency |
| Rx | Receive |
| SUD | Synthesizer Up/Down Converter |
| Tx | Transmit |
| VCP | Voice Coder Processor |
| VCU | Voice Codec Unit |

DETAILED DESCRIPTION OF THE PREFERRED EMBODIMENTS

Figure 1:
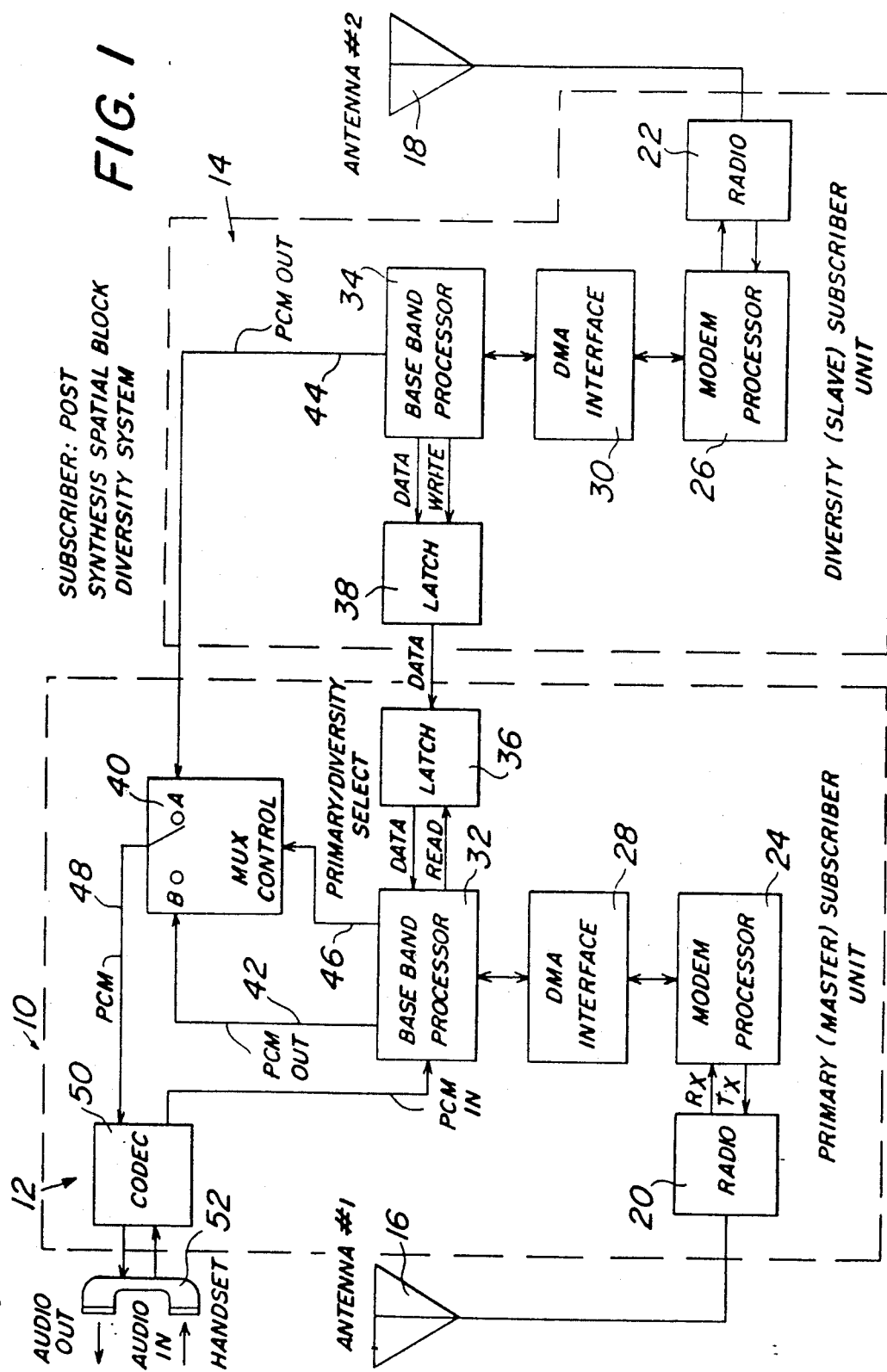
FIG. 1 is a block diagram of a post-synthesis spatial diversity system embodying the present invention utilized for reception in a subscriber unit.

FIG. 1 illustrates the invention applied to a subscriber unit generally designated 10 and comprises a primary (or master) unit, indicated at 12 and a diversity (or slave) unit indicated at 14. Each unit includes an antenna, as at 16 and 18 respectively, and each antenna is connected to a radio, as at 20 and 22 respectively. Each radio is in two-way communication, for both transmission and reception, with a modem processor, as shown at 24 and 26 respectively, and each modem processor is in two-way communication, via respective DMA interfaces 28 and 30, with respective baseband processors indicated at 32 and 34.

Each baseband processor is in communication with a respective latch, indicated at 36 and 38. Each baseband processor is also in communication with a multiplexer 40, as indicated at 42 and 44 respectively, whereby the pulse code modulation (PCM) signals from each baseband processor are applied to the multiplexer which includes a switch that is controlled through a line 46 by the baseband processor 32. The multiplexer applies its PCM output through line 48 to a codec 50 which is in two-way communication with the handset shown at 52.

In operation, when audio signals are received from the base station they are received by both the primary unit 12 and the diversity unit 14. These signals, which have been compressed and coded, for example by RELP analysis, pass from the respective antennas 16 and 18 to the respective radios 20 and 22 which pass them, as RF signals, to the respective modem processors 24 and 26. The modem processors demodulate the signals and pass the demodulated symbols into respective DMA interfaces 28 and 30, from where they are passed into the respective baseband processors 32 and 34.

Each baseband processor is provided with means to effect RELP synthesis on the incoming compressed data whereby the data is uncompressed or expanded. The uncompressed data (PCM) is selectively passed, either via line 42 from the primary baseband processor 32 or via line 44 from the baseband processor 34, to the multiplexer 40, depending on the position of the multiplexer switch.

Both baseband processors also function to detect parity errors by means of error coding. There are various forms of error coding known to the art such as, for example, "Hamming" coding, "Reed-Solomon" coding, and the like. In the present preferred embodiment, "Hamming" coding is used.

The speech data from the modem processor 24 is transmitted, via the DMA interface 28, to the baseband processor 32 which functions to perform the RELP synthesis and to detect the link quality, AGC level and parity errors in this data.

The speech data from the modem processor 26 is likewise transmitted, via DMA interface 30, to the baseband processor 34, Which functions to perform the RELP synthesis and to detect the quality data which includes the link quality, AGC level and parity errors in that speech data. The quality data from baseband processor 34 is then transmitted, via latches 38 and 36 which act as buffers, to the baseband processor 32.

The baseband processor 32 is programmed to compare the quality data containing the parity errors, link quality and AGC of its own circuit with that received from the baseband processor 34. It selects the best quality speech data, having the highest link quality, fewest parity errors and lowest AGC level, from the two circuits and, via line 46, uses the selected quality data to actuate the switch in the multiplexer to connect the multiplexer to either line 42 from the primary unit or line 44 from the diversity unit to utilize the speech data from the selected circuit. The resultant expanded PCM signal from the multiplexer passes, via line 48, to the codec 50 where it is converted to an analog signal and passed to the receive side of the handset 52.

Figure 2:
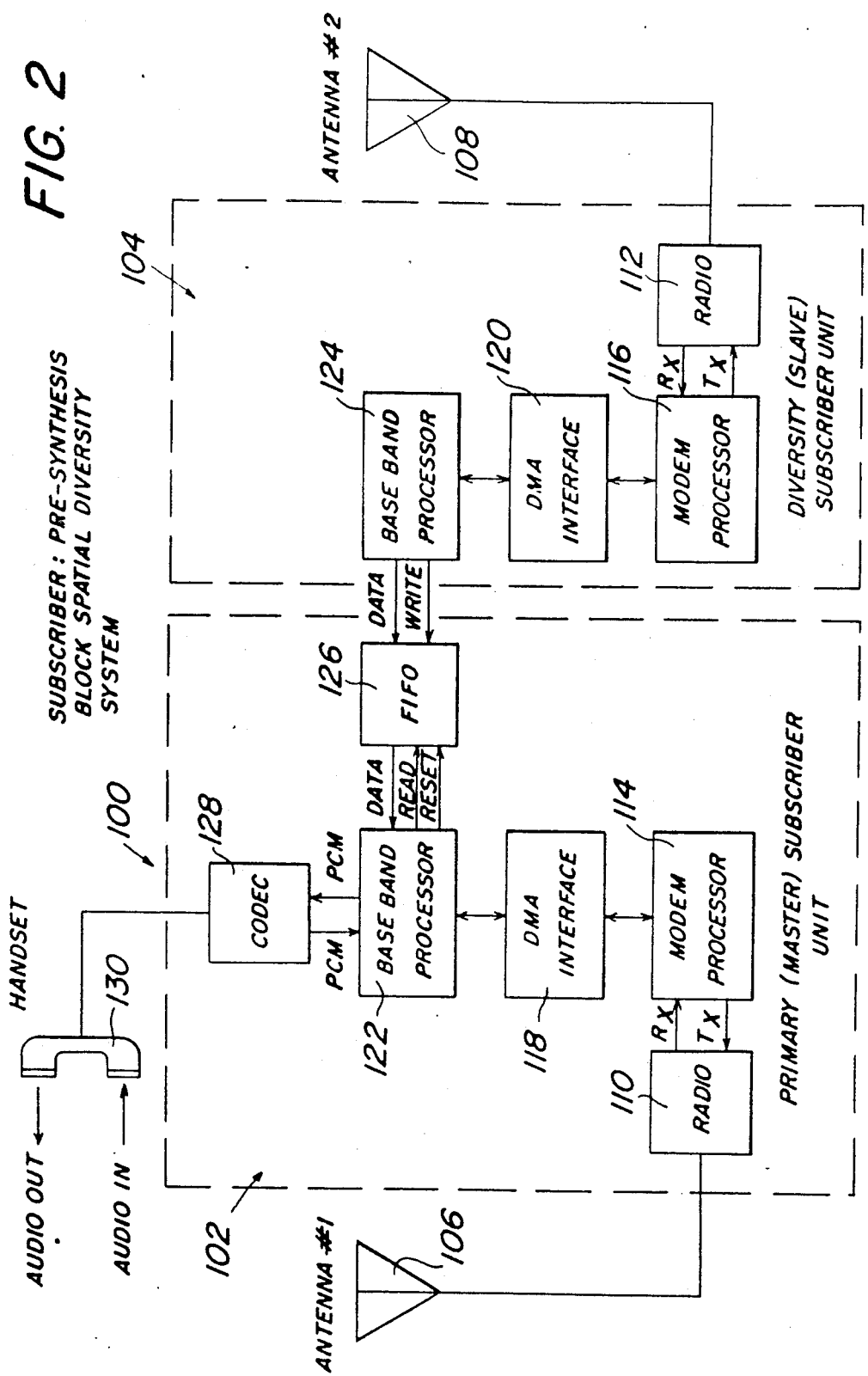
FIG. 2 is a block diagram similar to FIG. 1 but showing a pre-synthesis spatial diversity system.

The system shown in FIG. 2 is similar to that of FIG. 1 except that it represents a pre-synthesis system wherein the selected speech signal is transmitted to the primary baseband processor before being expanded and the primary baseband processor then expands and transmits the selected speech signal to the codec.

The system here is generally designated 100 and comprises a primary subscriber unit 102 and a diversity subscriber unit 104. Similarly to the system of FIG. 1, each unit comprises an antenna, respectively designated 106 and 108, a radio, respectively designated 110 and 112, a modem processor, respectively designated 114 and 116, each being in two-way communication with its corresponding radio, and a DMA interface, as at 118 and 120, connecting the respective modem processor with the respective baseband processor respectively designated 122 and 124.

In this form, the baseband processor 124 is in communication with the baseband processor 122 through a FIFO 126 but only the baseband processor 122 performs the RELP synthesis to expand the compressed signals. In this respect, the speech data is passed from baseband processor 124 through FIFO 126 to baseband processor 122. The latter compares the quality data comprising the link quality, parity error and AGC level in the speech data from baseband processor 124 with its own similar data and then takes the better compressed speech data and performs a RELP synthesis thereon to expand the compressed speech data to a PCM signal. It then passes the resultant PCM signal to the codec 128 where it is converted to an analog signal which is then passed to the receive portion of the handset 130.

Figure 3A:
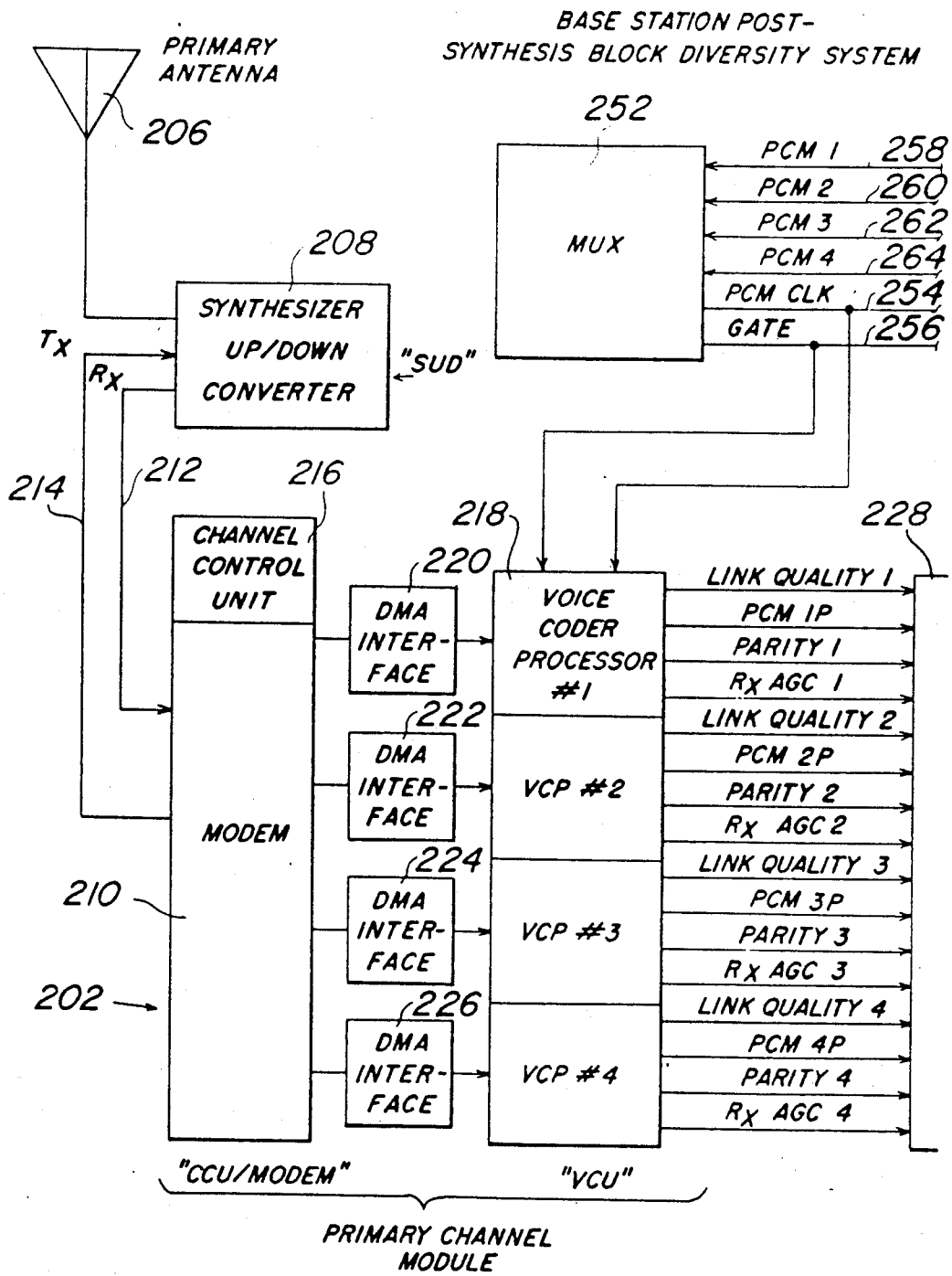
FIGS. 3A and 3B comprise a block diagram of a spatial diversity system of the post-synthesis type which is utilized in a base station.
Figure 3B:
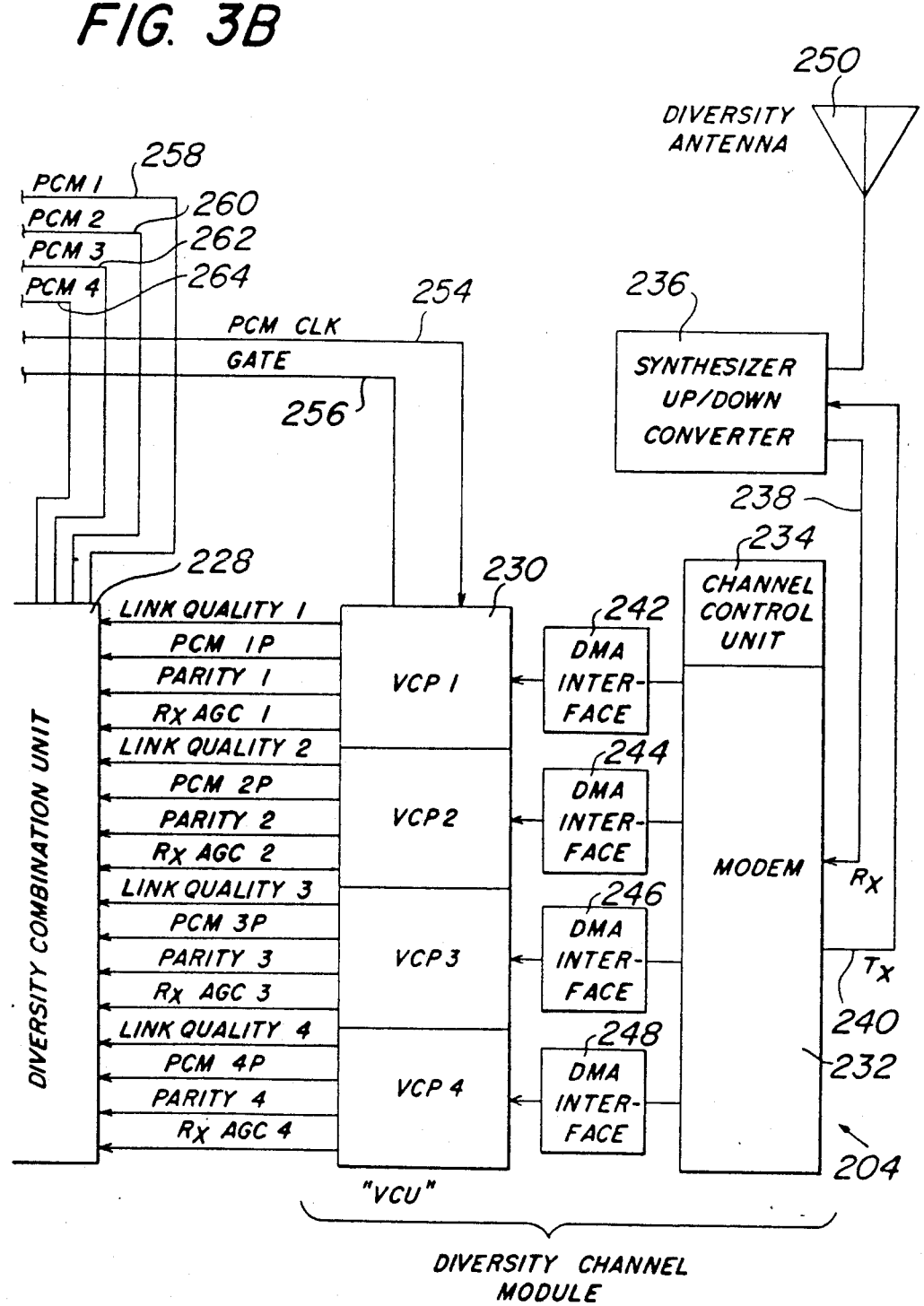

The diversity combiner system has been described above with reference to the subscriber station, but it is also adapted for use in the base station. Such a base station system (in the form of a post-synthesis system) is shown in FIGS. 3A and 3B, where it is generally designated 200. This system 200 comprises a primary channel module generally designated 202 and a diversity channel module generally designated 204.

The module 202 comprises an antenna 206 coupled to a synthesizer up/down converter (SUD) 208 that is in communication with a modem 210 via a receive line 212. The modem is also in communication with the SUD 208 via line 214 for transmission. The modem is coupled to a channel control unit (CCU) 216 which acts to transmit the data from the modem to the proper time slots.

The synthesizer of the SUD provides oscillator frequencies which are combined with frequencies received from the antenna and down-converted; after which they are passed to the modem via line 212. When transmitting, the IF frequencies from the modem are passed via line 214 to the SUD where they are combined with the oscillator frequencies of the synthesizer and upconverted for passage to the antenna. In either instance, since the oscillator frequencies are relatively error-free, whatever errors appear are assumed to be those found in the frequencies of the output of the antenna or modem.

The structure and functioning of the modem, the CCU and their associated elements are more fully described in U.S. Pat. Nos. 4,644,561 and 4,675,863; the disclosures of these patents being incorporated herein by reference.

The modem 210 is in communication with a voice codec unit (VCU), generally designated 218, comprising a plurality of voice coder processors (VCPs), here shown as four in number, and designated primary VCPs #1, #2, #3 and #4.

The modem 210 is in communication with each VCP in the VCU 218 via DMA interfaces respectively designated 220, 222, 224 and 226, which act to pass the speech data through the respective time slots from the modem 210 to the individual VCPs in the VCU 218. This speech data is analyzed by the respective primary VCPs which are programmed to determine the quality data comprising the parity errors, AGC levels and link quality, and to pass this quality data, together with the PCM, to the diversity combination unit 228.

The same type data is passed to the unit 228 from a VCU, generally designated 230. The VCU 230, which is identical to the VCU 218 and comprises diversity VCPs #1, #2, #3 and #4, forms part of the diversity channel module 204. A modem 232, similar to modem 210 and having a channel control unit 234, is in communication with a SUD 236, that is similar to SUD 208, via receive line 238 and transmit line 240.

The modem 232 is in communication with the VCU 230 via DMA interfaces respectively designated 242, 244, 246 and 248, which act to pass data through the respective time slots from the modem 234 to the VCU 230.

Both VCU's 218 and 230 receive their PCM timing from the multiplexer 252 via clock line 254 and gate line 256. The multiplexer 252, in turn, receives the PCM signals from the diversity combination unit 228 via lines 258, 260, 262 and 264.

Figure 4:
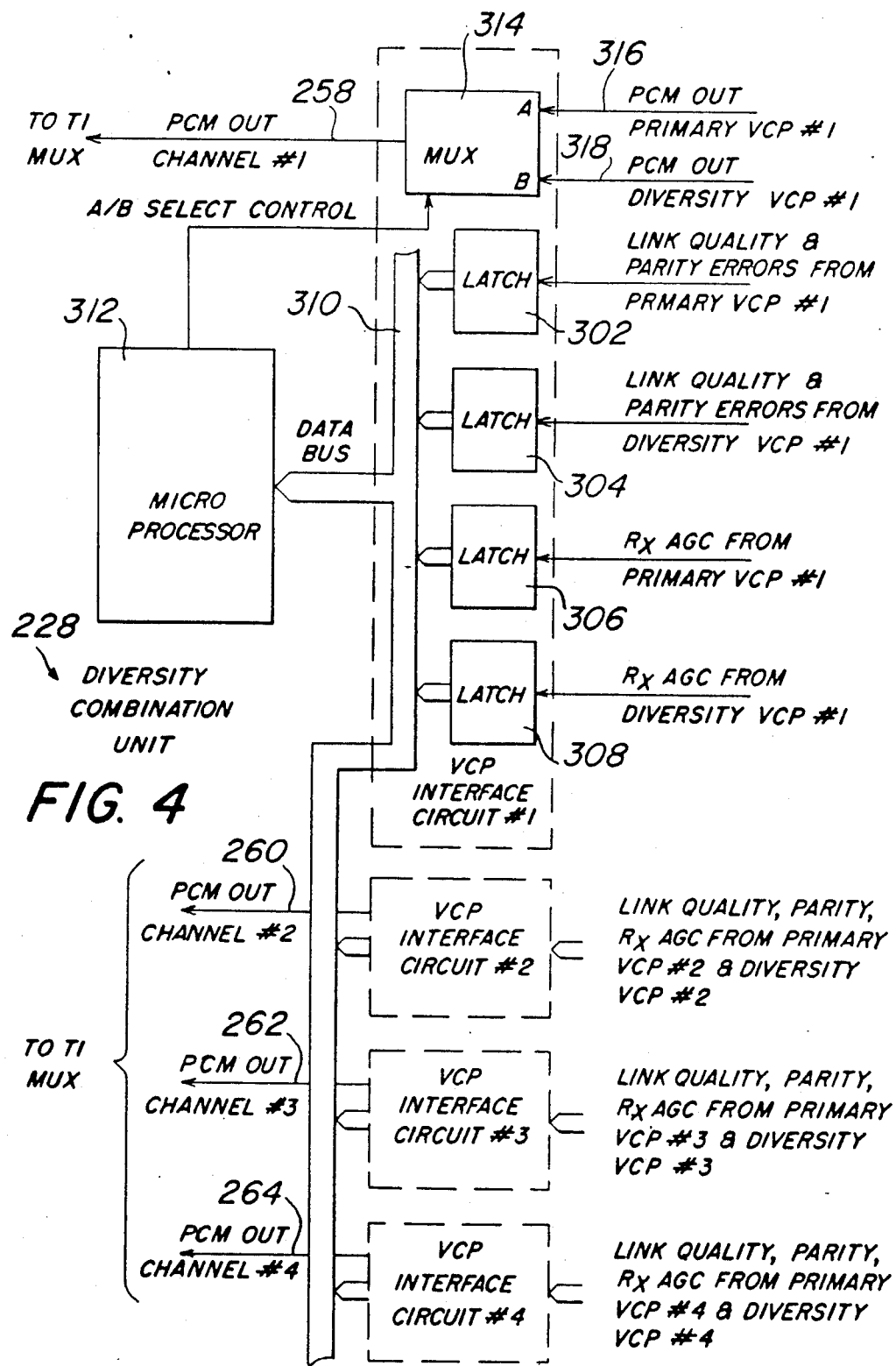
FIG. 4 is a block diagram of the diversity combination unit used in the system of FIGS. 3A and 3B.

The diversity combination unit 228, which comprises a plurality of VCP interface circuits, is more fully shown in FIG. 4. FIG. 4 shows the interface circuit for VCP #1 in detail but shows the other three VCP interface circuits only generally. However, all four VCP interface circuits are alike and each has the specific circuitry shown for VCP interface circuit #1.

Looking at the VCP interface circuit #1, there are four latches indicated respectively at 302, 304, 306 and 308. The latch 302 receives the link quality and parity error data from the VCP #1 of the primary VCU 218 while latch 304 receives the link quality and parity error data from the VCP #1 of the diversity VCU 230. The latch 306 receives the AGC data from the VCP #1 of the primary VCU 218 while the latch 308 receives the AGC data from the VCP #1 of the diversity VCU 230. All of the data of the four latches are passed through a common bus 310 to a microprocessor 312 which compares the primary and diversity quality data and determines which is preferable. The microprocessor used in this embodiment is an "Intel 8031" 8-bit microprocessor, manufactured by Intel Corp. of Santa Clara, Calif.

The preferable quality data is used to provide a control signal which throws a switch in a sWitch means 314 to one of two positions, one position receiving the PCM signal from the primary VCP #1 via line 316 and the other position receiving the PCM signal from the diversity VCP #1 via line 318. The selected PCM signal is passed from the switch means 314, via channel 258 (also shown in FIGS. 3A and 3B) to the multiplexer 252. The multiplexer 252 is part of the base station. This base station is not described here but is of the type shown in U.S. Pat. No. 4,777,633 and U.S. Pat. No. 4,779,262, both incorporated herein by reference.

The VCP interface circuits #2, #3 and #4, all identical to interface circuit #1, are connected, in common, to the bus 310 and provide PCM outputs on their respective channels indicated at 260, 262 and 264 respectively (also shown in FIGS. 3A and 3B).

The system has been described above with regard to reception of data; however, it is capable of operating in a similar but reverse manner when transmitting. In this respect, if one of the antennas provides better reception than the other it would also provide better transmission since the other antenna is subject to the same shadowing, etc. for both reception and transmission.

Figure 5:
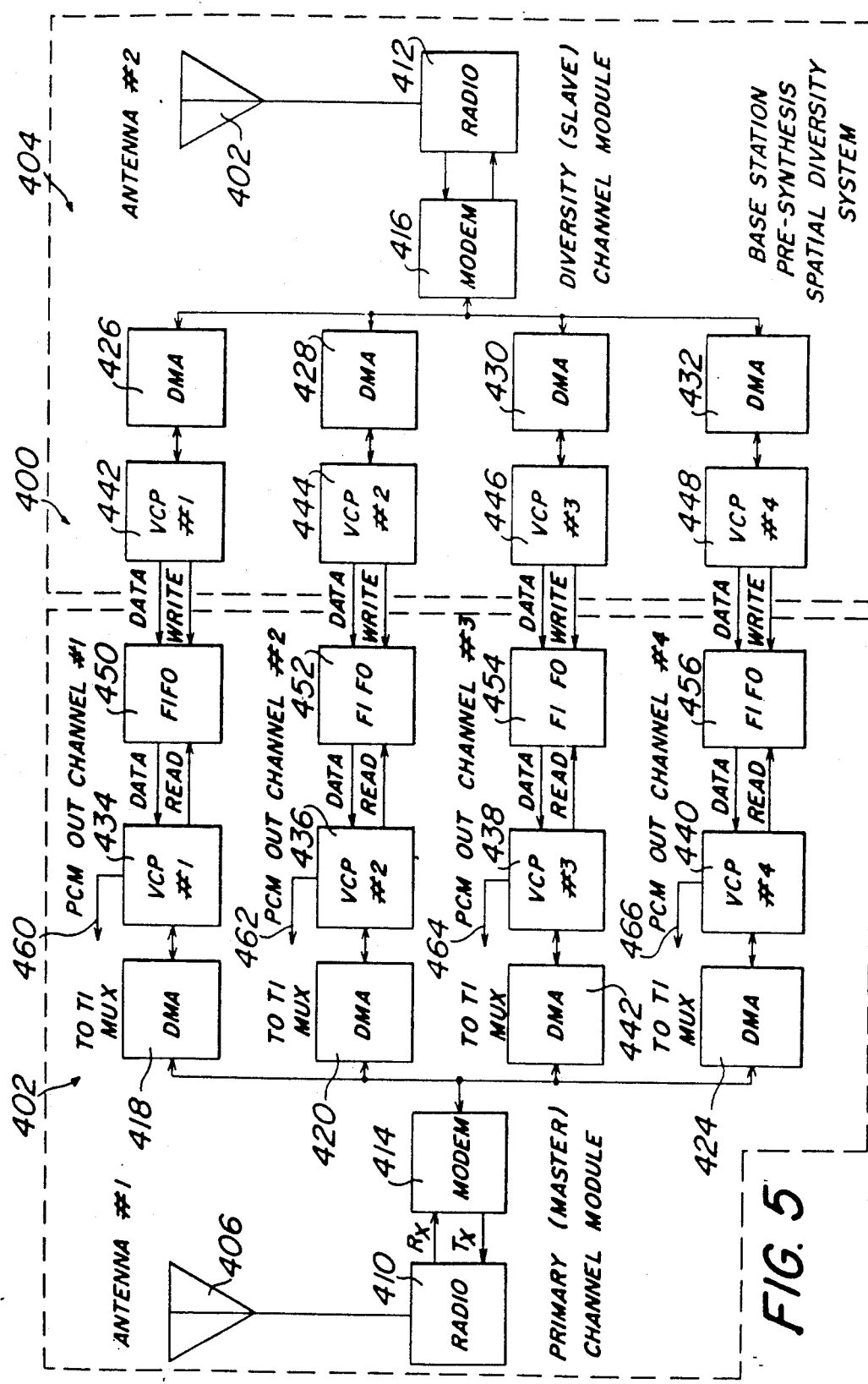
FIG. 5 is a block diagram of a pre-synthesis spatial diversity system utilized in a base station.

FIG. 5 shows a pre-synthesis base station system, generally designated 400, that comprises a primary module, designated 402 and a diversity module designated 404. Each has an antenna as indicated at 406 and 408 respectively. Each of these antennas are coupled to a radio, as at 410 and 412 respectively, and each radio is in communication with a modem, respectively designated 414 and 416.

Each modem is in communication with a plurality of DMAs, here shown as four in number, which are respectively designated 418, 420, 422 and 424 in the primary channel module, and which are respectively designated 426, 428, 430 and 432 in the diversity channel module. Each DMA is in communication with a respective VCP of the type shown in FIGS. 3A and 3B, these being designated 434, 436, 438 and 440 in the primary channel module and 442, 444, 446 and 448 in the diversity channel module.

The VCPs 434–440 of the primary channel module are in communication with respective FIFOs designated 450, 452, 454 and 456 while the VCPs 442–448 of the diversity channel module are also in communication with the FIFOs.

The primary VCPs are programmed to provide an additional comparison function whereby they take both their own quality data comprising the link quality, parity errors and AGC level plus that of the diversity VCPs, compare the two sets of quality data and perform the RELP synthesis (expansion) on the preferable compressed speech data. The resulting PCM data is applied via channels 460, 462, 464 and 466, to the multiplexer (not shown).

In addition to the above functions, an advantage of this system is that if one of the antennas becomes inoperative as for example, if struck by lightning or being otherwise damaged, a switch to the other antenna is automatically effected.

Although this system has been described above with relation to two antenna modules, it is possible to use more than two, whereby the best quality signal of each antenna is chosen by the primary unit to provide the PCM data. This would embody a primary antenna unit plus a plurality of diversity antenna units, and would be especially feasible for the base station.

It is, furthermore, also possible to utilize a plurality of antenna systems, each including a primary and one or more diversity units, with the primary unit of one system acting as the master of the entire network to make the choice of signals to be used. This, too, would be especially feasible for the base station.

The invention claimed is:

1. A spatial diversity system for a wireless digital telephone system comprising
    at least two antenna units for receiving and transmitting compressed and coded digital signals, wherein each unit comprises a radio operatively connected to an antenna, one of said units being a primary unit and each other unit being a diversity unit;
    the radio of each unit being in two-way communication, for both transmission and reception, with its own processing means, at least the processing means of said primary unit being constructed to expand the compressed digital signals and to detect quality data comprising link quality, AGC level and parity errors which are embodied in the digital signals;

means to transmit the quality data from each diversity unit to the processing means of the primary unit, the processing means of said primary unit being constructed to compare the quality data detected in the digital radio signals received through its own antenna with the quality data from each diversity unit and to select the best of such quality data; and the processing means of said primary unit being also constructed to actuate a switch means in accordance with the selected quality data to connect the system to the antenna unit having the selected quality data.

2. The spatial diversity system of claim 1 wherein the digital signals are transmitted to the radios of said antenna units from their respective antennas.

3. The spatial diversity system of claim 1 wherein the digital signals are transmitted from the radios of said antenna units to their respective antennas.

4. The spatial diversity system of claim 1 wherein each antenna unit has means to expand the signals received from its respective antenna.

5. The spatial diversity system of claim 1 wherein only the primary unit has means to expand the compressed signals and transmit them to the telephone system.

6. The spatial diversity system of claim 1 applied to a telephone subscriber station.

7. The spatial diversity system of claim 1 applied to a telephone base station.

8. The spatial diversity system of claim 1 wherein the digital signal having the selected quality data is transmitted to a multiplexer from which it passes into the telephone system.

* * * * *